United States Patent [19]
Follett et al.

[11] Patent Number: 6,094,712
[45] Date of Patent: *Jul. 25, 2000

[54] COMPUTER NETWORK INTERFACE FOR DIRECT MAPPING OF DATA TRANSFERRED BETWEEN APPLICATIONS ON DIFFERENT HOST COMPUTERS FROM VIRTUAL ADDRESSES TO PHYSICAL MEMORY ADDRESSES APPLICATION DATA

[75] Inventors: David R. Follett, Boxborough; Maria C. Gutierrez, Concord; Richard F. Prohaska, North Reading, all of Mass.

[73] Assignee: Giganet, Inc., Concord, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/762,186

[22] Filed: Dec. 4, 1996

[51] Int. Cl.$^7$ ........................................ G06F 12/00
[52] U.S. Cl. .................... 711/203; 711/3; 711/206; 370/412
[58] Field of Search ........................ 711/203, 147, 711/173, 206, 209, 217, 141; 395/876, 200.59; 370/394; 710/26, 53

[56] References Cited

U.S. PATENT DOCUMENTS

| | | | |
|---|---|---|---|
| 5,388,215 | 2/1995 | Baker et al. | 395/200.59 |
| 5,406,322 | 4/1995 | Port et al. | 348/15 |
| 5,426,639 | 6/1995 | Follett | 370/94.1 |
| 5,592,625 | 1/1997 | Sandberg | 711/147 |
| 5,623,700 | 4/1997 | Parks et al. | 710/53 |
| 5,659,798 | 8/1997 | Blumrich et al. | 710/26 |
| 5,682,553 | 10/1997 | Osborne | 395/876 |
| 5,706,461 | 1/1998 | Branstad et al. | 711/203 |
| 5,749,095 | 5/1998 | Hagersten | 711/141 |
| 5,825,765 | 10/1998 | Menzilcioglu et al. | 370/394 |

FOREIGN PATENT DOCUMENTS

| | | |
|---|---|---|
| 0 471344A1 | 2/1992 | European Pat. Off. . |
| 0 526104A2 | 2/1993 | European Pat. Off. . |
| 0 571166A2 | 11/1993 | European Pat. Off. . |

OTHER PUBLICATIONS

Noboru Endo, Takahiko Kozaki, Toshiya Ohuchi, Hiroshi Kuwahara and Shinobu Gohara, "Shared buffer Memory Switch For An ATM Exchange", IEEE Transactions on Communications 41, Jan. 1993, pp. 237–245.

James P.G. Sterberz and Gurudatta M. Parulkar, "Axon: A High Speed Communication Architecture For Distributed Applications," 1990 IEEE, pp. 415–425.

Yasuharu Tomimitsu, Satoru Kawanago, Hirotaka Yamane, Hideki Kobunaya, Shoji Ohgane, Nobuyunki Mizukoshi and Hiroshi Suzuki, "An ATM Chip Set For High Performance Computer Interfaces, Affording Over 100 Mbps Sustained Throughput," 2334c IEICE Transactions On Electronics E78–C (1995), Dec., No. 12, Tokyo, JP.

*Primary Examiner*—Do Hyun Yoo
*Assistant Examiner*—Nasser Moazzami
*Attorney, Agent, or Firm*—Cesari and McKenna, LLP

[57] ABSTRACT

A computer interface system for communicating between computers along designated circuits is provided. An interface unit is provided in each host computer. Each unit includes a memory map that stores a map of physical addresses that correspond to virtual addresses for each application involved in a communication link. Each transfer of data is designated by a circuit that is established using the ATM protocol. The circuit is recognized by each unit involved in the communication and facilitates direct access of each host computer's main memory with minimum intervention from the operating system. A novel dynamic buffer management system is also provided.

27 Claims, 5 Drawing Sheets

COMPUTER NETWORK INTERFACE FOR DIRECT MAPPING OF DATA TRANSFERRED BETWEEN APPLICATIONS ON DIFFERENT HOST COMPUTERS FROM VIRTUAL ADDRESSES TO PHYSICAL MEMORY ADDRESSES APPLICATION DATA

FIELD OF INVENTION

This invention relates to communications among applications running on different computers and computer subsystems. Specifically, it relates to the direct mapping of application data on one computer to physical memory addresses in another computer, and more particularly a switching arrangement that performs memory addressing functions between at least two networked computers substantially free of operating system intervention.

BACKGROUND OF THE INVENTION

The transfer of data and instructions between data processing devices in a cluster or network is accomplished using interface units included in each device. Such data processing devices can include, for example, computers and shared I/O devices such as—disk servers and communication links to external networks. A link that typically transmits data among these units in serial form is used. Switches may be provided to route the data particularly when three or more devices are linked.

At any time, a number of data transfers may be in progress among application programs running on different computers. A number of networking arrangements have been implemented to accomplish these transfers. In general, such conventional networking approaches have failed to provide the desired combination of low latency, high speed and low cost.

It is, therefore an object of this invention to provide a low-cost computer interface system that provides significant reductions in latency and increases in the speed of data transmission between linked data processing devices. This interface system should use on-board resources efficiently to minimize hardware costs.

SUMMARY OF THE INVENTION

This invention overcomes the disadvantages of the prior art by providing each host data processing device (e.g. computer) with an interface unit that stores, for each open communications circuit involving an application in the host device, a map identifying the virtual addresses specified by the application with corresponding physical addresses in the host's main memory. These physical addresses are the locations in the host device of data to be transferred between the application and a specific application running on another device. Data transfers occur along virtual circuits that each carry a unique identifier that facilitates data routing between computers. Each interface unit includes a series of registers or "memories" that are indexed or "mapped" in terms of the circuit identifiers.

The interface unit can, thus, transfer data to and from the main memory without resorting to time-consuming calls to the host operating system for protocol processing or to translate virtual memory locations provided by the application to physical memory addresses in the main memory. In addition, the registers in the interface unit can be used to retain protocol state information on a circuit-by-circuit basis. This facilitates protocol acceleration.

The invention also provides a novel buffer arrangement within the interface units and within switches used when three or more host data processing devices are involved. Buffer space is assigned dynamically to data transmission circuits passing through the interface, and switch, thus minimizing the required size of the buffer memory and lowering hardware costs. This technique also enables various "fair" and/or adaptive scheduling algorithims to be used.

BRIEF DESCRIPTION OF THE DRAWINGS

The foregoing and other objects and advantages of the invention will become clear with reference to the following detailed description as illustrated by the drawings in which.

DETAILED DESCRIPTION

Figure 1A:
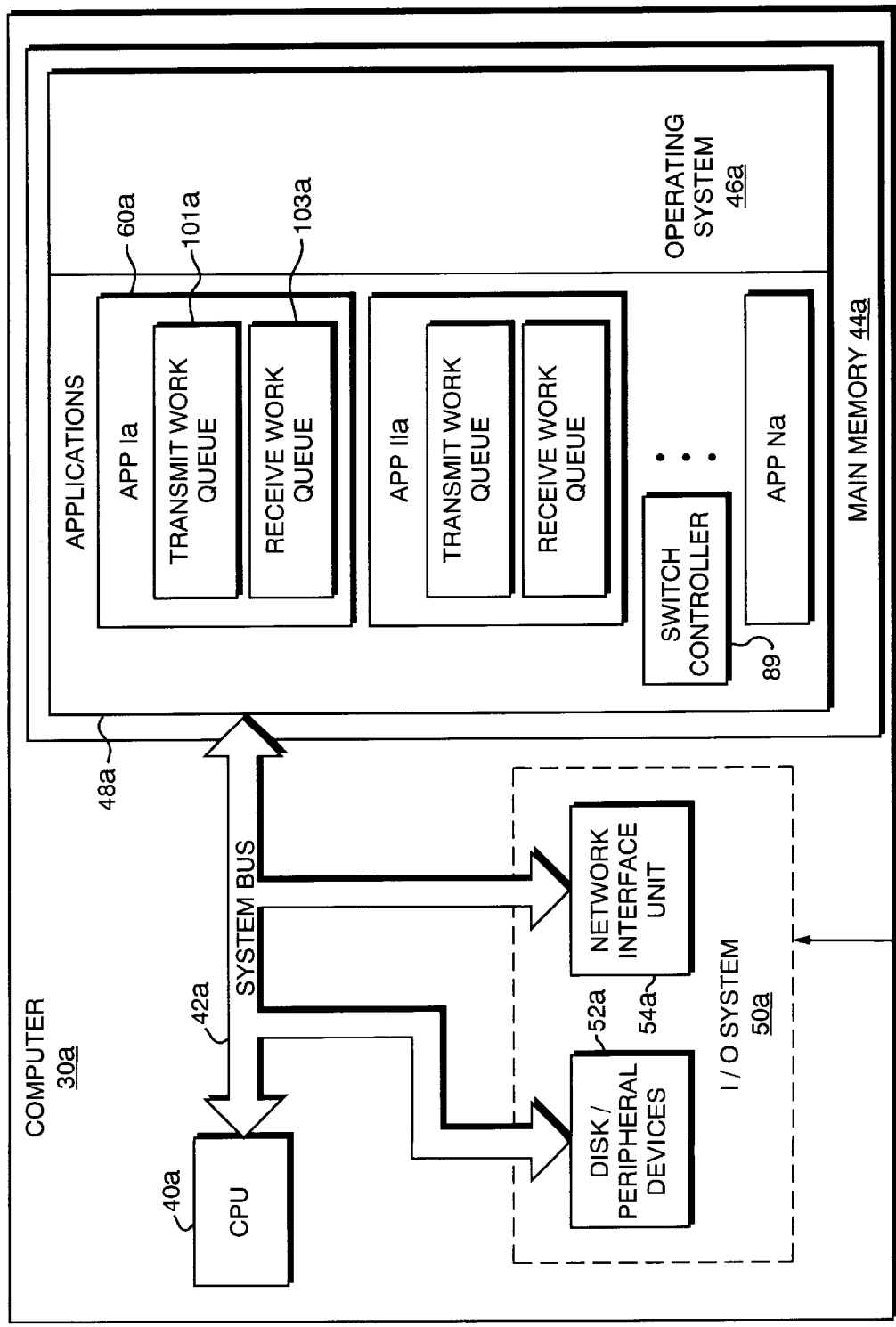
FIG. 1 is a block diagram of a network of computer systems that are linked in communication with each other according to this invention.
Figure 1B:
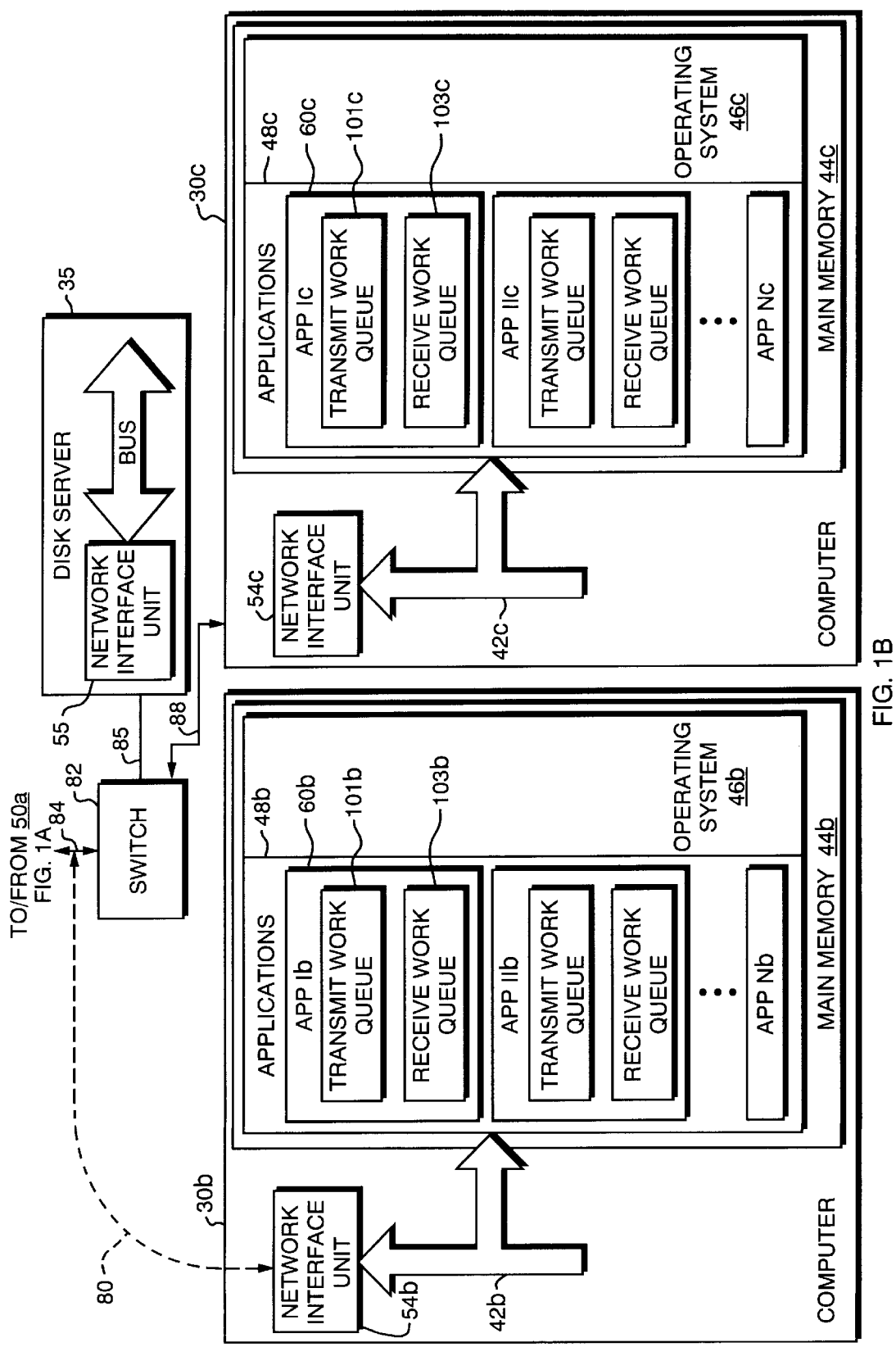

FIG. 1 illustrates a basic clustered computer system according to this invention. By way of example, a cluster having three computers is illustrated. Although computers are shown in this example, one or more of the computers can be another data processing device such as a disk server or communication link to an external network. The use of this system with such other devices is, therefore, expressly contemplated.

Reference shall be made generally to computer 30a for the purposes of this description. It shall be assumed that computer 30a is interconnected with computers 30b and computer 30c. As used herein, like reference numbers having a suffix "a", "b" or "c" shall refer to like components in each of the respective computer systems 30a, 30b and 30c. It is contemplated that these host computers 30a, 30b and 30c can differ in architecture so long as they are otherwise compatible to communicate with each other in a manner to be described below. A disk server 35 is also illustrated. Furthermore, as used herein, the term "data" when occuring in connection with the interface unit of this invention shall refer to both control (e.g. TCP/IP header information) and raw data. The interface of this invention includes framing functions that convert both control and data strings into ATM-framed data for transmission between data processing devices. The framed data is reconverted to control and data strings on the receiving end using the same functions.

Computer 30a comprises a CPU or central processing unit 40a linked by a parallel system bus 42a to a main memory 44a. Within the main memory 44a are blocks of locations that contain an operating system 46a and a series of computer application programs 48a.

An I/O system 50a can include disks and other peripheral devices 52a and a network interface unit 54a according to this invention, all coupled to the system bus 42a. The interface unit 54a enables communication with the computers 30b and 30c and the disk server 35. Computer 30b includes its own network interface unit 54b connected to its system bus 42b and computer 30c includes a network interface unit 54 connected to its system bus 42c. In a cluster in which only two computers (e.g., computer 30a and computer 30b) are connected, a direct interconnection 80 (shown in phantom) can be provided between the interface units 54a and 54b. Conversely, where multiple (e.g., three or more) computers are linked, a switch 82 is provided to route signals among the devices in the cluster. This disk server 35 is also connected in the cluster through the switch 82. It includes its own network interface unit 55 that is identical in architecture to the other units 54a, 54b and 54c. The direct connection 80 between two computers and the multiple links 84–86, and 88 among three or more computers (and the disk server 35) may take any suitable form such as LVDS (low voltage differential signaling) links or fiber OPTIC links.

Figure 2:
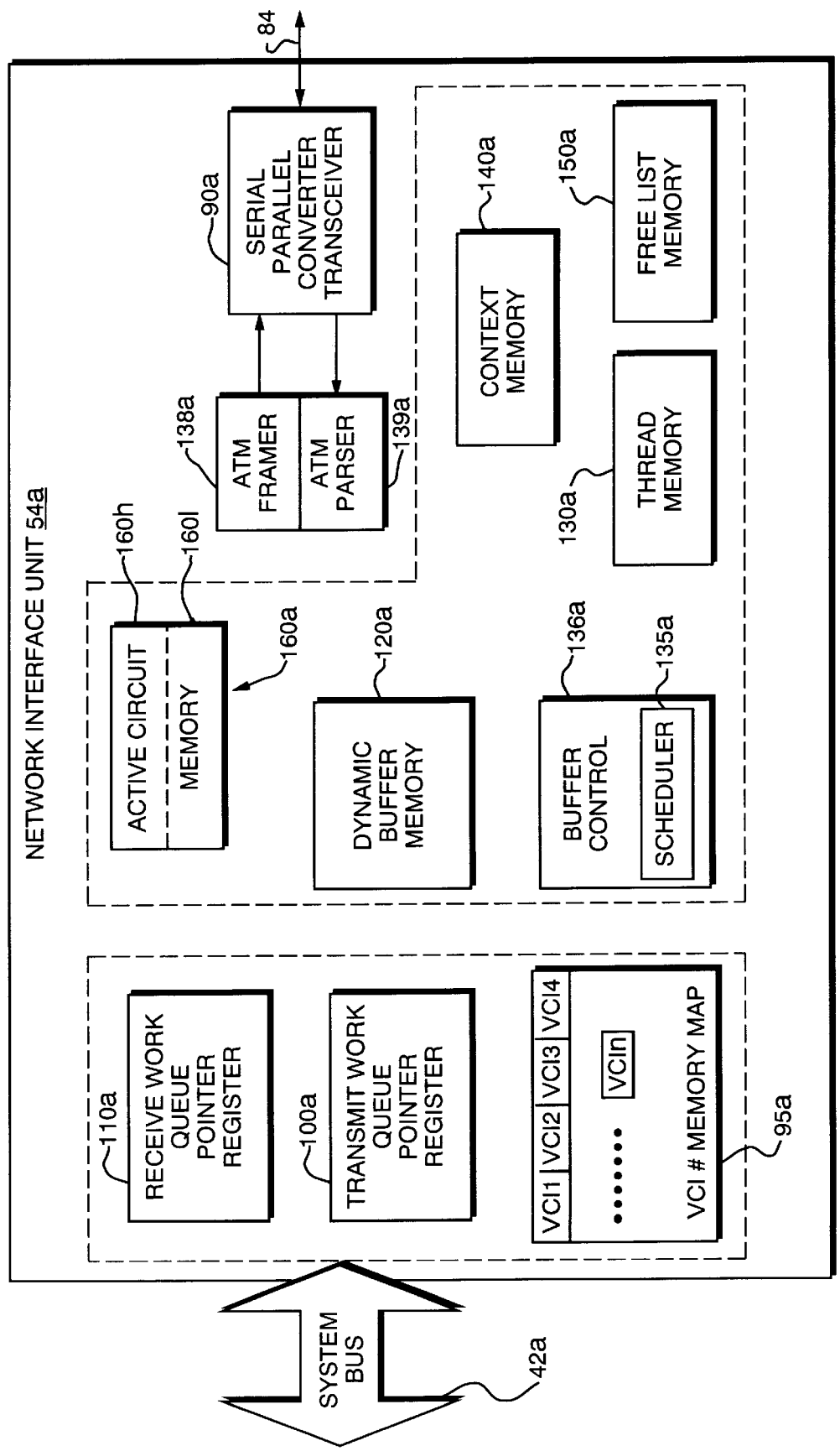
FIG. 2 is a more detailed block diagram of a network interface unit according to this invention.
Figure 3:
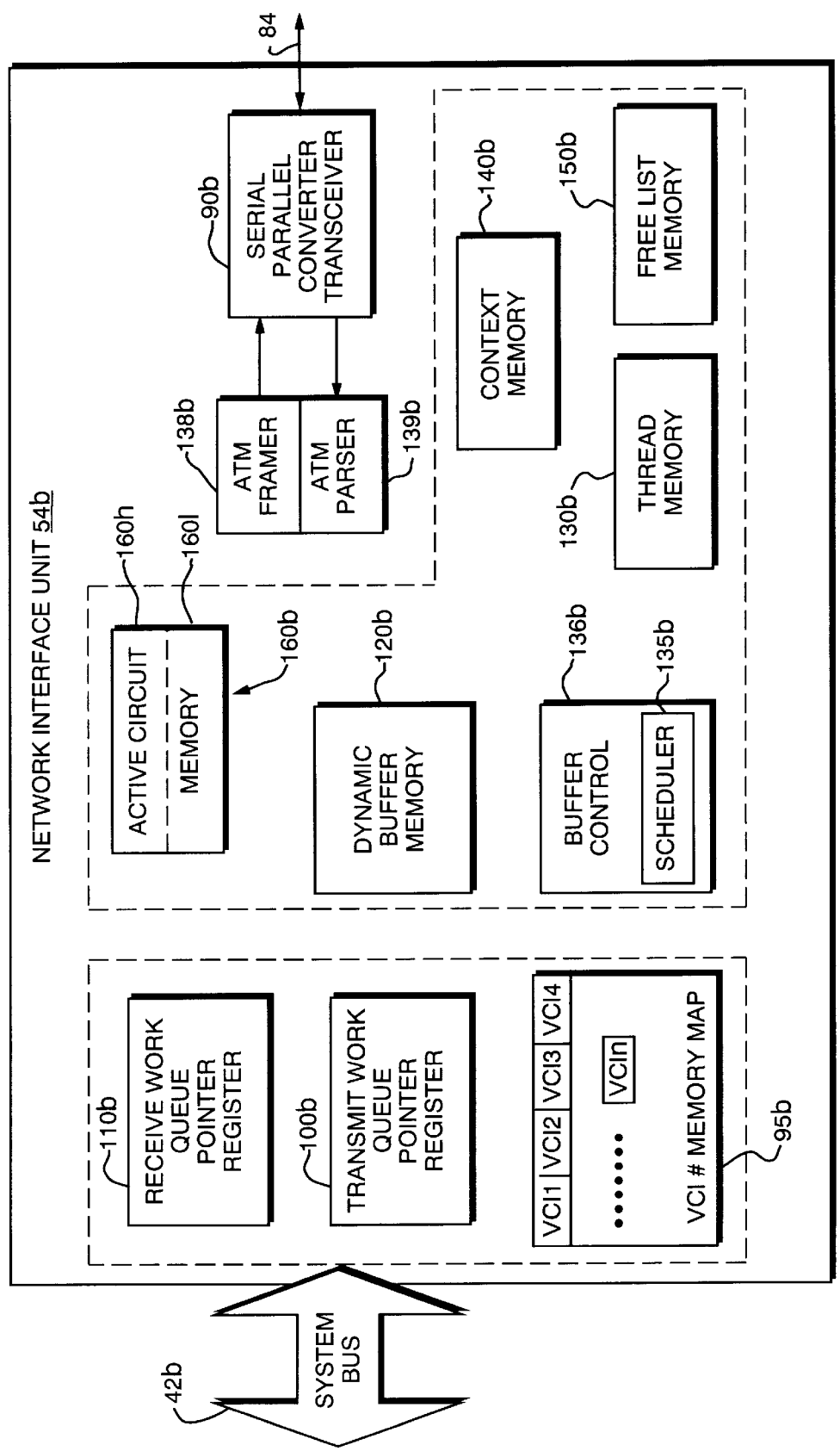
FIG. 3 is a more detailed block diagram of another network interface unit according to this invention.

FIGS. 2 and 3 show the network interface units 54a and 54b respectively, in greater detail. We shall now describe operation of the network interface units in greater detail, assuming first that the units 54a and 54b are interconnected by the serial link 80.

The link 80 is operatively connected to the network interface units 54a and 54b through respective transceiver/serial-parallel converters 90a and 90b. The transceivers 90a and 90b can both send and receive data for two-way communication over the link 80.

The preferred mode of data transfer between the network interface units is the well-known Asynchronous Transfer Mode (ATM). In ATM, messages are transferred in packets or "cells". All communications are framed in terms of the ATM UNI (User to Network Interface) standard. One or more virtual circuits are set up among application programs, running on different data processing devices (computers 30a, 30b and 30c and disk server 35 for example). Each data cell transmitted through the network has a header that includes a virtual circuit identifier (VCI) of the virtual circuit. In a multi-link circuit, there may be a different VCI for each link. Each circuit is established in full-duplex mode, with bidirectional data transfer between host devices occurring under the same circuit identifiers. The virtual circuits and their corresponding VCI's are generally established when the system boots up based upon the communication requirements of the applications present in each of the data processing devices. Further virtual circuits may be established and existing circuits discontinued dynamically as needed by application programs in the cluster.

While ATM is described as the preferred communication standard according to this embodiment, it is expressly contemplated that other communication standards and protocols can be used in conjunction with the interface system according to this invention. For example, the TCP/IP protocol can be used. Appropriate framing/deframing modules that are well-known and commercially available can be employed to establish this communication standard in connection with the system of this invention. Thus, while the ATM standard is shown and described herein, TCP/IP, encryption standards and other compatible communication protocols can be substituted and the description is taken to include these alternative protocols.

When an application 60a running on computer 30a, for example, is to establish a circuit to a particular application 60b running on computer 30b, the application 60a informs the operating system 46a that the contents of a block (or blocks) of locations in memory 44a, identified by virtual memory addresses used by that application, are to be used in transmissions to and/or receipt from the application 60b, running on computer 30b. The application also communicates to the operating system the priority of the circuit, the protocol processing type, relevant flow control parameters and relevant transfer optimization parameters.

A switch controller 89, that is preferably implemented as a software application on the computer 30a receives instructions from the operating system to establish virtual circuits. It communicates with the network through the network interface unit 54c. The controller 89, having received a request for establishment of a circuit from the operating system 46a, opens communication with the target computer's operating system 46b. It also communicates with the switch 82 in a manner to be described below. The controller 89 instructs each of the operating systems 46a and 46b to utilize a specific VCI.

When circuits are established, corresponding pointers, each indexed by VCI, are established in a transmit work queue pointer register 100a of the interface unit 54a. Each pointer points to a transmit work queue 101a associated with a particular application 60a within the host main memory 44a that is reserved for storage of transmit work queue information for the corresponding VCI. Each entry in the transmit work queue 101a stored in the main memory contains the start locations of control (e.g. TCP/IP) and data information and the amount of data to be transferred. As transfers are accomplished, the pointer in the register 100a is advanced to the next entry in the register by the interface unit 54a.

The operating system 46a loads into a mapping memory 95a in the unit 54a a map of the virtual addresses provided by the application 60a to the corresponding physical memory addresses in memory 55a. The physical addresses being, mapped are normally locked in the host by the operating system so as not to be overwritten by other applications running on computer 30a. The memory 95a includes a separate map for each virtual circuit through the interface unit 54a. For each virtual circuit there is an associated transmit work queue 101a and a receive work queue 103a (described below) that is stored in the host main memory 44a. The mapping memory 95a, transmit work queue pointer register 100a and receive work queue pointer register 110a (also described below) are in the "address space" of the system bus 42a and can therefore be directly addressed by the operating system 46a and application 60a, respectively. Applications can, thus write directly to and read from these registers at any time.

At the receiving end of the transfer, the target application 60b has supplied the operating system 46b with the virtual addresses in memory 44b that are to receive and transmit data in the subject circuit. Operating system 46b loads a mapping memory 95b on the interface unit 54b with a map of these virtual addresses to the corresponding physical addresses in main memory 44b and locks the physical addresses in the host operating system 46b to prevent inadvertent overwrite. For each virtual circuit there is an associated receive work queue 103b. Each entry in the work queue includes the beginning virtual addresses in the memory 44b to which control and data are to be transferred and the number of bytes of memory space following these addresses. An associated entry in a receive work queue pointer register 110b is provided on the interface unit 54b. This entry contains a pointer to the next entry in the work queue 103b for that circuit. The pointer is initially set by the application 60b and then advanced by the interface 54b to the next work queue entry after completion of the work specified in the entry. A notification technique is used to inform the application 60b of the arrival of control information and data. This technique can include a well-known polling and/or interrupt routines.

Since each virtual circuit handles data transmissions in both directions, e.g., from the application 60a to the application 60b and from the application 60b to the application 60a, the reverse setup procedure also takes place. The application 60a also makes the appropriate entries in its receive work queue pointer register 100a, receive work queue 103a and the transmit work queue pointer register 100b. The application 60b makes appropriate entries, when needed, in its transmit work queue 101b and associated pointer register 100b.

The switch 82 is set up by the controller 89 concurrently with the interface units. The procedure is described below. Data transmitted over the links 80, 84–86 and 88 is in ATM cells of 48 data bytes and 5 header bytes each. The instantaneous rates at which data enters the interface unit 54a and at which it is transmitted from the unit will ordinarily differ. It is also desirable to transfer larger blocks of data in and out of the host memory and to transfer smaller cells over the network link. Moreover, a plurality of virtual circuits will ordinarily be open at any given time, requiring the unit to mux and demux the circuits in real time. Accordingly, a buffering arrangement is included in the interface units. Specifically, we include a buffer memory 120a into which incoming data is loaded and from which outgoing data is retrieved. While any previously known buffer arrangement can be used, we prefer to use the dynamic buffer arrangement described below, since its size can be substantially less than that of other arrangements. First, however, we shall describe the manner in which the invention accomplishes a transfer of the data between applications running on different computers.

Context memories 140a, b and c are provided in the interface units 54a, b and c. The context memory 140a, for example, contains an entry for each circuit or potential circuit occupying space in the buffer memory 120a. Each entry is indexed by its VCI and includes the priority level of the circuit, the number of buffer memory bytes occupied by the circuit, flow control parameters, host transfer optimization information, protocol state information, the receive and transmit head and tail addresses of the circuit's data in the thread memory 130a and the host notification mechanism (e.g. interrupt or polling routine).

Each network interface unit 54a, b or c also includes an active circuit memory 160a, b or c containing a list of all the active circuits with data in the dynamic buffer memory 120a, b or c. In other words any incoming data or outgoing data (appearing in the transmit work queue 101a) will have an entry in the active circuit memory 160a. The memory 160a is divided in sections according to message priority. For example, if there are two priority levels, "higher" and "lower", each active circuit memory would have two sections 160(H) and 160(L).

Under the control of a scheduler 135a, which is part of a controller 136a that regulates loading into and retrieval from the buffer memory, each of the interface units 54 cycles through the higher priorities entries in its active circuit memory 160a and, one-by-one, it performs the operations specified by the transmit and receive work queues corresponding to those entries. Thus, when interface unit 54a retrieves an entry from its transmit work queue 100a, it enters into the context memory the beginning virtual address in the main memory of the information to be transferred, and the number of bytes to be transferred. It then retrieves from the mapping memory 95a the physical addresses of beginning locations in the main memory 44a. The unit 54a then retrieves from the host main memory 44a the data in those locations and loads it into a group of segments (clusters of locations) in the buffer memory 120a. It then updates the context memory entry for that circuit. Specifically, it updates main memory 44a virtual address to the next address from which data is to be retrieved, and it decrements the amount of data to be transferred, by the size of the block retrieved from the memory 44a.

At a subsequent time, the scheduler 135a initiates retrieval of a cell from the block of control and/or data that is now resident in the buffer memory 120a. A packaging unit 138a having cell and framing capabilities constructs an ATM cell of the retrieved data. That is, an ATM header is appended to the data using well-known techniques. The packaging unit also performs all necessary network communication functions including execution of check sum routines to ensure data accuracy. At the frame level, the context memory 140a retains state information, such as the ATM AAL-5, CRC and the frame protocol, and appends this information to the frame trailer per the ATM standard. A frame may or may not be extended over multiple cells that may or may not be intermixed with cells from different circuits.

At the receiving end, a parser 139b in the unit 54b interprets the header on the cell and causes the data portion of the cell to be loaded into the buffer memory 120b. Incoming ATM cells are entered one-by-one into the buffer 120b. Subsequently, the data is retrieved and transferred to specific physical memory locations in the host main memory 44b, as identified in the mapping memory 95b. When all transmit work queue descriptors for a given virtual circuit are completed and if no more incoming or outgoing data is present in the buffer memory 120a, then the corresponding entry in the active circuit memory 160b is removed. Clearly, the foregoing arrangement is efficient because, with the use of direct physical memory locations in main memories 44a and 44b, the transfer of control and data is made without the intervention of either of the host operating systems.

In a preferred buffer arrangement message data is transferred into and out of each network interface units 54a, 54b and 54c via the respective dynamic buffers 120a, 120b and 120c. The size of the buffer depends on the requirements and speed of the computer network. Typically, a RAM buffer having a size of 160 bits×4 Kbits, i.e., a capacity of 640 Kbits will be sufficient. For management purposes, the memory is divided into segments, each of which contains a number, e.g., 20, of contiguous memory locations. In this example, each location contains a single byte of data.

The buffer arrangement includes, in addition to the buffer memory 120a, a thread memory 130a, a free list memory 150a and a context memory 140a. The thread memory contains, for each transmit circuit link and each receive circuit link occupying space in the buffer memory 120a, a thread, i.e., linked list, of the buffer segments occupied by the circuit, in the order in which data was entered into these segments. The earliest entry in the thread is at the "head" and the latest is at the "tail". The free list memory is a FIFO memory containing a list of available segments in the memory 120a. However multiple threads can exist simultaneously in a single memory, each having its own discrete series of pointers and links held in the context and thread memories, respectively. If there is no data for a specific circuit in the buffer memory 120a, then no buffer memory or thread memory resources are allocated to that circuit and the head and tail pointer in the context memory 140a are nulled. This arrangement, thus, allocates resources with greater efficiency and enables, in general, a lower total memory size.

When data is to be loaded into the memory 120a, the buffer control 136a retrieves the addresses free buffer memory segments, as needed, from the free list memory 150a, and loads the data into those buffer segments. It also updates the free list memory and the thread memory.

Specifically, as each segment is filled, that segment's associated thread is updated to point to the next available segment being allocated from the free list. It also updates the head address and byte count in the context memory 140a entry for that circuit.

When data is retrieved from the buffer memory 120a, the reverse procedure is followed. That is retrieval begins at the tail address of the associated thread. When the retrieval operation is complete, the tail and byte count in the context memory 140a are updated. As segments are freed, they are added back to the free list in memory 150a and the associated thread memory is cleared.

In this embodiment, the context memory 140a is provided with the number of bytes in the dynamic buffer 120a that are utilized by each circuit link. The operation of the thread memory 130a is monitored to derive the number of bytes for each virtual connection.

The interface system according to this invention makes possible the dynamic optimization of data transfers. That is, the system operates efficiently for large bulk transfers of data and for smaller transfers. This optimization is based in-part on the establishment of priority and flow control standards.

Each writing operation into the dynamic buffer 120a is generally followed by a reading operation in which information is retrieved from the buffer. Higher priority retrievals (reads) are recognized first, followed by the lower priority retrievals. Within priority levels, the system cycles continuously through the active circuit entries in "round-robin" fashion. In transmission of data, one ATM cell is transferred at a time from the buffer memory to the network link 84a. In receiving data, variable blocks of data (typically 256 bytes) are transferred to the host, optimizing latency. When the buffer begins to saturate, then the data may be transferred to the host computer in larger blocks, optimizing the transfer efficiency, to prevent memory overload. Ordinarily, this occurrence results from host saturation, so that access to the system bus is temporarily limited. Clearly the foregoing arrangement copes with the problem of overflow by using a more-efficient mode of transfer to the host main memory, i.e. larger block size.

The network interface units 54 operate as bus masters as the system busses of the respective host computers. In other words, they are capable of initiating operations on these buses. It should be noted, also, that each of the memories or registers 95a, 100a, 110a, 130a, 140a, 150a and 160a used in the network interface unit 54a is preferably a discrete physical memory so that a plurality of these memories can be accessed simultaneously. This enhances the operating speed of the network interface unit 54a.

The above description has focused upon a data transfer between two discrete computers 30a and 30b. We shall now discuss the routing of data between a cluster of three or more linked computers. The processes described above remain unchanged.

Figure 4:
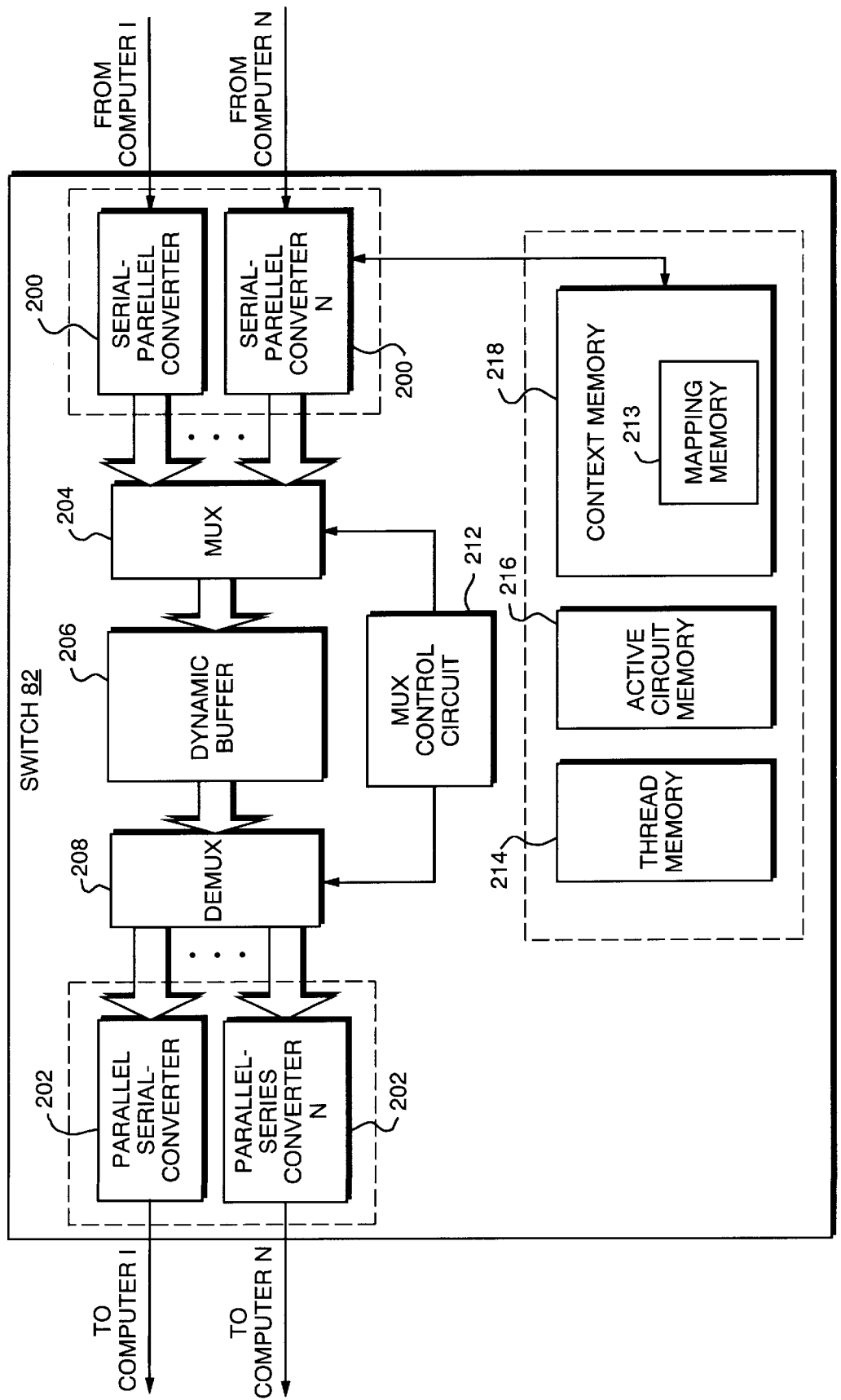
FIG. 4 is a block diagram of a switch according to this invention.

A switch 82 (FIG. 1) is used to route communications among three or more computers. A preferred embodiment of the switch 82 is depicted in FIG. 4. The switch receives incoming signals through a set of serial-parallel converters 200 from a plurality of computers. Likewise, outgoing signals are routed to the computers through a series of outgoing parallel-serial converters 202. The incoming and outgoing signals can, of course, derive from and be routed to a variety of data processing devices besides computers. For example, the switch 82 can be interconnected with one or more other switches. Furthermore, these incoming and outgoing functions can be provided by a single converter circuit such as the circuit 90 detailed in FIG. 2. The incoming signals are routed to a multiplexer (MUX) 204 that enables selection of a single input to a dynamic buffer 206. Likewise, outgoing signals precede to a demultiplexer (DEMUX) 208 that selects the appropriate outgoing converter 202. A MUX/DEMUX control circuit 212 governs routing of signals to and from the buffer based upon the operation of the dynamic buffer control circuit 210. Operation of the dynamic buffer is substantially similar to that of the network interface unit 54a. A dynamic buffer control circuit 210 comprises a series of memories like those described with reference to the interface units of FIGS. 2 and 3.

Specifically, the switch includes a mapping memory that maps each incoming VCI to the outgoing VCI of the same circuit and to the output port for each outgoing VCI. The thread memory 214, the context memory 218 and the active circuit memory are arranged in terms of either the incoming VCI's or the outgoing VCI's. The mapping memory 213 is interconnected with the context memory. When the switch controller establishes each circuit, it also instructs the switch context memory 218 and mapping memory 213 to establish a circuit indexed by the corresponding VCI. The context/mapping memory 218, 213 includes entries with respect to each VCI of the head address, the tail address, the byte count, the flow control status and the transmission priority. Assuming that determination of the outgoing VCI takes place when the incoming cell is to be loaded into the buffer 206. The incoming VCI is replaced with the outgoing VCI that is mapped from the memory 213 before the cell is written into the dynamic buffer 206. Unlike the data processing device interfaces 54a, b and c, in which physical addresses are mapped in connection with a given VCI, the switch 82 undertakes a direct VCI-to-VCI mapping.

While not shown, the switch 82 and each of the interface units include flow control circuitry that communicates with various computers and switches in the system to prevent excessive data inflow. These circuits can be implemented using well-known arrangements and can be linked using a discrete flow control data line.

The foregoing has been a detailed description of a preferred embodiment of the invention. Various modifications and additions can be made without departing from the spirit and scope of the invention. For example, the buffer control system described can be varied and substituted for a variety of other acceptable buffer control protocols. Such protocols should be able to transfer data based upon the establishment of virtual circuits and their corresponding identifiers according to this invention. ATM is only one of a plurality of possible communication standards that can be employed. Other standards that are contemplated include the TCP standard. Likewise, other types of network switch can be used in conjunction with the network interface units of this invention. Finally, while the term "network interface unit" is used herein, it is expressly contemplated that any acceptable platform can be utilized for the interface according to this invention and the interface can be provided as a permanent system in an overall computer, disk, peripheral or other data processing device. Accordingly, this description is means to be taken only by way of example and not to otherwise limit the scope of the invention.

What is claimed is:

1. A data processing device interface for accomplishing a transfer from a transmitting application running on a first data processing device, having an internal bus and a first main memory connected to said bus, to a receiving application running on a second data processing device, said transmitting application providing transmit virtual addresses in said main memory of data to be transmitted to said receiving application, said interface comprising:

A. a mapping memory;

B. a transmit work queue pointer register;

C. software means in said first data processing device for:
1. loading into said mapping memory the transmit physical addresses corresponding to said transmit virtual addresses, and
2. entering into said transmit work queue pointer register a pointer that comprises an address in a transmit work queue that contains a specification of each data transmission, said specification including an identification of the transfer, an amount of data in said data transmission and an identification of a location of each of said transmit virtual addresses in said mapping memory;

D. means for accessing said first main memory in accordance with said physical addresses contained in said mapping memory to retrieve said data therefrom; and E. means for transmitting said retrieved data to said second application.

2. The interface defined in claim 1 further including:

A. a receive work queue pointer register,

B. means for interrogating a receiving application running on said first data processing device for the identification of receive virtual addresses in said first main memory into which received data transferred to that receiving application from a transmitting application on said second data processing device is to be loaded, C. software means in said first data processing device for:
1. loading into said mapping memory receive physical addresses in said first memory corresponding to said receive virtual addresses, and
2. entering into said receive work queue pointer register a pointer that comprises an address in a receive work queue that contains a specification each data transmission, said specification including an identification of the transfer, an amount of data in said data transmission and an identification of a location of each of said receive virtual addresses in said mapping memory, D. means for receiving data, from said second data processing device, identified by said transfer identification, and E. means for accessing said first main memory by means of said receive physical addresses contained in said mapping memory to load into those addresses data received from said transmitting application on said second data processing device.

3. The interface defined in claim 1 wherein transmitting means includes a framing and deframing unit that frames data for transmission to said second data processing device based upon a predetermined communication standard.

4. The interface defined in claim 3 wherein the predetermined communication standard comprises an ATM communication standard.

5. The interface defined in claim 2 wherein the transmitting means includes a framing and deframing unit that frames the data for transmission to said second data processing device based upon an ATM communication standard.

6. The interface defined in claim 5 wherein the identification of each data transfer identifies a virtual circuit identified by a respective virtual channel identifier, and wherein the transmit work queue pointer register includes locations corresponding to each virtual circuit.

7. The interface defined in claim 6 wherein at least one segment of the transmit work queue pointer register and one segment of the receive work queue pointer register include an entry corresponding to each established virtual circuit.

8. The interface defined in claim 7 wherein the mapping memory includes locations corresponding to the respective virtual circuits for storing respective transmit physical addresses and receive physical addresses.

9. The interface defined in claim 2 wherein each of the mapping memory, the transmit work queue pointer register and the receive work queue pointer register is in the address space of the bus.

10. The interface defined in claim 6 further comprising a buffer memory for selectively storing data received from the bus and retrieving stored data for transmission to the bus, the buffer memory including a buffer controller that operates the buffer memory to store and retrieve data for each virtual circuit on a time-shared basis.

11. The interface defined in claim 10 wherein the buffer memory is constructed and arranged to selectively store data received from and retrieve data for transmission to the second data processing device over a communication link and wherein the buffer controller is constructed and arranged to cause the buffer memory to store data received from the second data processing device for each virtual circuit on a time-shared basis.

12. The interface defined in claim 11 further comprising a thread memory containing threads each defining pluralities of entries between respective head entries and a tail entries, each of the threads corresponding to an active virtual circuit and each of the entries comprising an address representative of an active memory segment in the buffer memory for the corresponding active virtual circuit and the entries of each of the threads respectively defining a linked list of segment addresses, and further comprising means, in the buffer controller, for adding entries to the thread memory and deleting entries from the thread memory based, respectively, upon a loading into and emptying corresponding memory segments in the buffer memory.

13. The interface defined in claim 12 further comprising a free list memory having a plurality of entries each corresponding to an unoccupied segment in the buffer memory that is free of data stored, and further comprising means in the buffer controller for removing an entry having a predetermined segment address from the free list memory, and concurrently establishing an entry having the predetermined segment address in the thread memory.

14. The interface defined in claim 13 further comprising a context memory interconnected with the buffer memory and the bus, for storing a plurality of entries, each of the entries corresponding to a predetermined virtual circuit, each of the entries including, for the respective virtual circuit, information defining a data transfer priority level, the head location and the tail location or a thread of segment addresses in the buffer memory and an amount of data contained in the buffer memory.

15. The interface defined in claim 11 wherein the buffer controller includes means for storing data in the buffer memory in blocks having predetermined sizes on a time-shared basis retrieved from the first main memory over the bus and means for varying sizes of the blocks based upon a priority of a respective virtual circuit with which the blocks are associated whereby higher-priority virtual circuits have associated therewith larger sized blocks than other lower-priority virtual circuits.

16. The interface defined in claim 11 wherein the buffer controller is constructed and arranged to enable storage in the buffer of blocks received over a communication line from the second data processing device on a non-time shared basis.

17. The interface defined in claim 16 wherein the buffer controller is constructed and arranged to direct the means for storing to store a plurality of blocks received from the second data processing device sequentially in the buffer.

18. The interface defined in claim 2 further comprising an active circuit memory, interconnected with said bus, that stores entries identifying each data transfer for which a specification is contained in at least one of the transmit work queue pointer register and the receive work queue pointer register, the active circuit memory including means for continuously storing new entries as new data transfers are initiated and deleting existing entries as existing data transfers are completed.

19. The interface defined in claim 18 wherein each of the entries in the active circuit memory includes an identification of a respective priority level of the data transfer.

20. The interface defined in claim 2 wherein associated with each the transmit work queues and with each receive work queue is a respective pointer register segment, each pointer register segment having an entry corresponding to a specification in the respective transmit work queue and receive work queue each entry including a pointer representative of a location in the respective transmit work queue and receive work queue of the specification for the next data transfer to occur.

21. A switch for accomplishing transfers of data from transmitting applications running on transmitting data processing devices to receiving applications running on receiving data processing devices, each transmitting data processing device including means for framing the data with a virtual circuit identifier, said switch comprising:

A. a plurality of input ports for reception of data from transmitting data processing devices;

B. a plurality of output ports for transmission of data to receiving data processing devices;

C. a mapping memory containing entries relating virtual circuit identifiers to output ports;

D. a switch buffer memory for selectively storing data received from the transmitting data processing device and for retrieving stored data for transmission to a receiving data processing device, the switch buffer memory including a switch buffer controller that operates the memory to store and retrieve data based upon the virtual circuit identifiers;

E. a switch thread memory containing threads each defining pluralities of entries between a head entry and a tail entry, each of the threads corresponding to an active virtual circuit and each of the entries comprising an address representative of an active memory segment in the switch buffer memory corresponding to each active virtual circuit and the entries defining a linked list of segment addresses for each of the respective threads, and further comprising means, in the switch buffer controller, for adding entries to the thread memory and deleting entries from the thread memory based, respectively, upon a loading into and emptying corresponding memory segments in the switch buffer memory;

F. a switch free list memory having a plurality of entries each corresponding to an unoccupied segment in the switch buffer memory that is free of data stored, and further comprising means in the switch buffer controller for removing an entry having a predetermined segment address from the free list memory, and concurrently establishing an entry having the predetermined segment address in the thread memory;

G. a context memory, interconnected with the switch buffer memory, for storing a plurality of entries, each of the entries corresponding to a predetermined virtual circuit identifier, each of the entries including, for the respective virtual circuit identifier, information defining a data transfer priority level, the head location and the tail location of a thread of segment addresses in the switch buffer memory and an amount of data contained in the switch buffer memory; and H. means for directing data retrieved from said buffer memory to the output port relating to the virtual circuit identifier associated with the data.

22. The switch defined in claim 21 further comprising a switch active circuit memory, interconnected with the switch buffer controller, that stores entries identifying each virtual circuit for which data is contained in the switch buffer memory, the switch active circuit memory including means for continuously storing new entries as new data transfers are initiated and deleting existing entries as existing data transfers are completed.

23. The switch defined in claim 22 wherein each of the entries in the switch active circuit memory includes an identification of a respective priority level of the data transfer.

24. A method for accomplishing a transfer from a transmitting application running on a first data processing device, having an internal bus and a first main memory connected to said bus, to a receiving application running on a second data processing device, said transmitting application providing transmit virtual addresses in said main memory of data to be transmitted to said receiving application, said interface comprising:

A. providing a mapping memory;

B. providing a transmit work queue pointer register;

C. by means of software running on said first data processing device:
  1. loading into said mapping memory the transmit physical addresses corresponding to said transmit virtual addresses, and
  2. entering into said transmit work queue pointer register a pointer that comprises an address in a transmit work queue that contains a specification of each data transmission, said specification including an identification of the transfer, an amount of data in said data transmission, an identification of a destination of said data and a location of each of said transmit virtual addresses in said mapping memory;

D. accessing said first main memory in accordance with said physical addresses contained in said mapping memory to retrieve said data therefrom; and E. transmitting said retrieved data to said second application.

25. The method defined in claim 24 further comprising:

A. providing a receive work queue pointer register,

B. interrogating, by means of software running on said first data processing device, a receiving application running on said first data processing device for the identification of receive virtual addresses in said first main memory into which received data transferred to that receiving application from a transmitting application on said second data processing device is to be loaded, C. by means of software running on said first data processing device:
   1. loading into said mapping memory receive physical addresses in said first memory corresponding to said receive virtual addresses, and
   2. entering into said receive work queue pointer register a pointer that comprises an address of a receive work queue that contains a specification each data transmission, said specification including an identification of the transfer, an amount of data in said data transmission and identification of a location of each of said receive virtual addresses in said mapping memory,
D. receiving data, from said second data processing device, identified by said transfer identification, and
E. accessing said first main memory by means of said receive physical addresses contained in said mapping memory to load into those addresses data received from said transmitting application on said second data processing device.

26. The method defined in claim 25 wherein each of the step of transmitting and the step of accessing includes framing the data according to an ATM communication standard.

27. The method as defined in claim 26 further comprising storing into and retrieving data from a buffer memory, the steps of storing and transferring being based upon the virtual circuit identifier corresponding to each data transfer, and further including prioritizing the steps of storing and transferring based upon priority criteria associated with each virtual circuit identifier.

* * * * *